United States Patent [19]
Smitherman

[11] 3,761,113

[45] Sept. 25, 1973

[54] SELF ALIGNING AND ADJUSTABLE WAGON TONGUE

[75] Inventor: John B. Smitherman, Danville, Ind.

[73] Assignee: The Raymond Lee Organization, Inc., New York, N.Y.

[22] Filed: Aug. 5, 1971

[21] Appl. No.: 169,188

[52] U.S. Cl. .......................... 280/478 R
[51] Int. Cl. ............................ B60d 1/14
[58] Field of Search ............ 280/478 R, 477, 491 F

[56] References Cited
UNITED STATES PATENTS

| | | | |
|---|---|---|---|
| 2,170,983 | 8/1939 | Adams | 280/478 R |
| 3,345,082 | 10/1967 | Atkins | 280/477 |
| 1,730,077 | 10/1929 | Isachsen | 280/477 X |
| 2,438,032 | 3/1948 | Bready | 280/415 A |

*Primary Examiner*—Leo Friaglia
*Attorney*—Richard Shreve, Jr.

[57] ABSTRACT

A hollow pipe is secured at one end to a wagon, and a trailer drawbar is secured to the base of a cone shaped member. A cable secured at one end to the apex of the cone member and at the other end to a movable means on the pipe is disposed intermediate its ends over rollers. Lever means tightens or loosens the cable to secure or release the member in the pipe.

1 Claim, 6 Drawing Figures

PATENTED SEP 25 1973
3,761,113
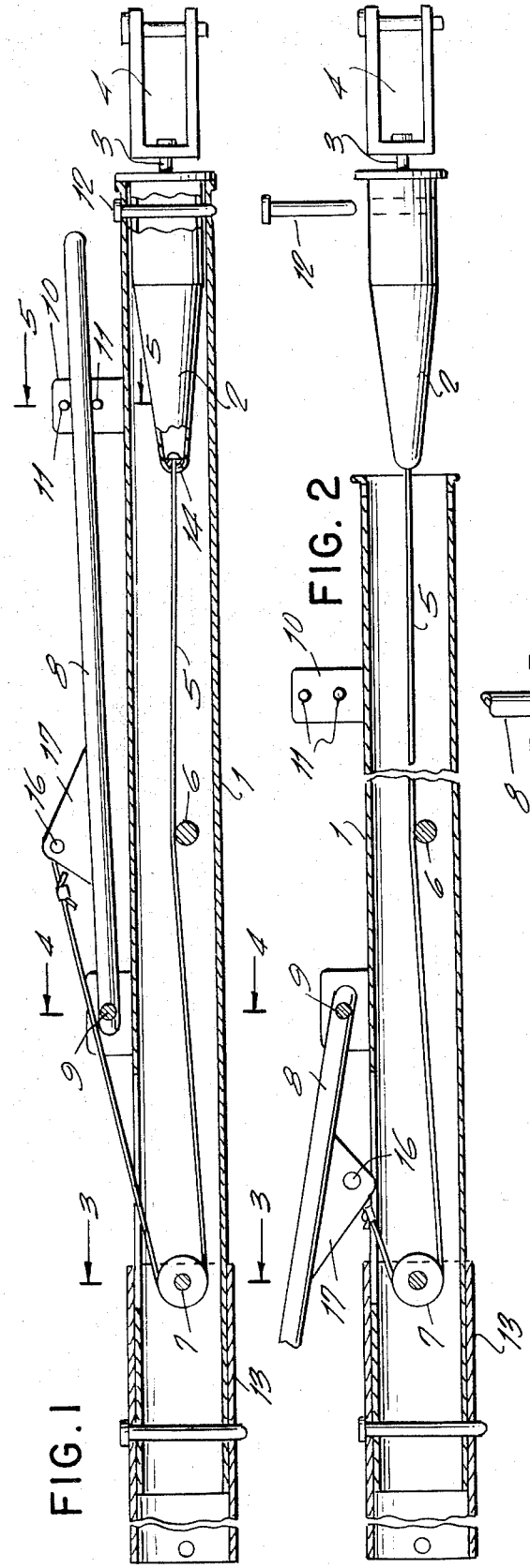
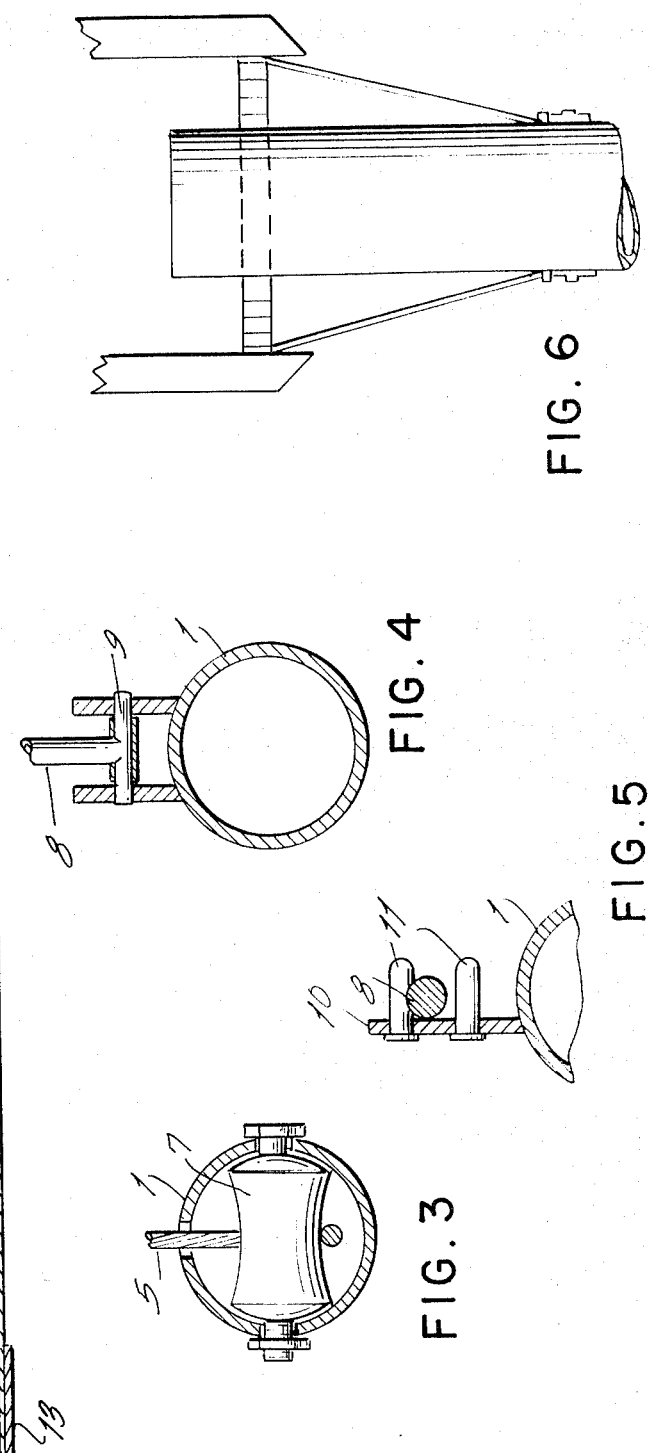
INVENTOR.
JOHN B. SMITHERMAN

SELF ALIGNING AND ADJUSTABLE WAGON TONGUE

FIELD OF THE INVENTION

My invention is directed toward apparatus for connecting, with ease and minimal effort, a farm wagon or similar implement to the drawbar or other point of connection on a tractor. The invention eliminates the need of completely accurate positioning and alignment to connect the bar and wagon.

SUMMARY OF THE INVENTION

To this end, the bar is connected to the base of a conically shaped member which can be disposed at least partially within one end of a hollow pipe, the other end of which is secured to the wagon. Lever and cable means pull the apex of the member into the pipe to make the desired connection between wagon and tractor and can release the apex whereby pipe and member separate to release the wagon from the tractor. The cone shape enables sufficient play or tolerance within the pipe whereby self alignment ensues.

BRIEF DESCRIPTION OF THE DRAWINGS

In the drawings:
FIG. 1 is a vertical cross section of my invention;
FIG. 2 is a similar view with the parts shown in different position;
FIG. 3 is a section taken along line 3—3 in FIG. 1;
FIG. 4 is a section taken along line 4—4 in FIG. 1;
FIG. 5 is a section taken along line 5—5 in FIG. 1; and
FIG. 6 is an enlarged view of a portion of the structure shown in FIG. 1.

DETAILED DESCRIPTION OF PREFERRED EMBODIMENTS

Referring now to FIGS. 1–6, a pipe or suitable housing 1 forms the main load bearing member as the wagon tongue proper, being hollow and open at either end. A cone shaped device 2 has a forward portion (FIG. 1) disposed in the housing. The actual point of attachment 4 for the trailer is connected by bolt 3 to member 2. The device 2 has an enlarged base preventing the base from entering in pipe. The cone apex 14 is secured to one end of a steel cable 5 threaded over roller 6 and around pulley 7 to be connected to point 16 on bracket 17. This bracket is secured to lever 8. Lever 8 is pivoted about point 9 on housing 1. The free end of lever 18 is detachably locked by pins 11 in bracket 10. A locking bolt 12 is provided to eliminate strain on the movable components.

An additional length of pipe 13 can be inserted over the opposite or wagon end of pipe 1 to permit additional adjustment of the extended length of the wagon tongue.

A suitable winch can be added at the point of attachment of bracket 9 and connected to cable 5, thus eliminating use of lever 8, brackets 9 and 10 and locking pin 11.

The lever is operated by pulling pin 12 out, and lifting the lever out toward pins 11. This slackens the cable allowing member 2 to move forward freely. Being cone shaped, the forward end of the tongue is allowed to move without resistance. After member 2 is seated, lever 8 is locked in pins 11 and pin 12 is reinserted.

During this process, the wagon tongue will have been completely aligned with the point of connection on the tractor or implement from any position in an area of approximately 1 foot or so either side of or behind the intended point of attachment.

While I have described my invention with particular reference to the drawings, such is not to be considered as limiting its actual scope.

Having thus described this invention, what is asserted as new is:

1. In combination:
a hollow pipe open at both ends, one end being securable to a wagon or the like;
a cone shaped member fitting into the other end of the pipe, and having an enlarged base which forms a stop preventing the base from entering the pipe, the apex of the member fitting loosely in the other pipe end, said base being securable to the draw bar of a trailer or the like; and
manually operable means including a cable secured to said apex and extending in said pipe to pull said member into locking engagement with the other end of the pipe or to release said member therefrom;
wherein said cable is secured at one end to the apex and at the other end to said means outside the pipe;
wherein said cable intermediate its ends passes over a roller and around a pulley in said pipe;
wherein said combination is a self aligning and adjustable wagon tongue, and said means includes a lever pivotable about a point on the outside of the pipe, the other end of said cable being secured to said lever.

* * * * *